(12) United States Patent
Benrachi et al.

(10) Patent No.: US 10,904,704 B2
(45) Date of Patent: Jan. 26, 2021

(54) SYSTEM AND METHOD FOR MANAGING A MASS GATHERING

(71) Applicant: BULL SAS, Les Clayes-sous-Bois (FR)

(72) Inventors: Samia Benrachi, Châtenay-Malabry (FR); Taoufik Mohib, Riyadh-KSA (SA); Emmanuel Wensink, Bern (CH)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/233,694

(22) Filed: Dec. 27, 2018

(65) Prior Publication Data
US 2019/0208365 A1    Jul. 4, 2019

(30) Foreign Application Priority Data
Dec. 31, 2017   (FR) ..................... 17 63428

(51) Int. Cl.
| | |
|---|---|
| *H04W 4/029* | (2018.01) |
| *G06Q 30/02* | (2012.01) |
| *G06K 9/00* | (2006.01) |
| *G06Q 10/04* | (2012.01) |
| *G06Q 50/26* | (2012.01) |
| *G07C 9/38* | (2020.01) |

(Continued)

(52) U.S. Cl.
CPC ........ *H04W 4/029* (2018.02); *G06K 9/00778* (2013.01); *G06K 9/6223* (2013.01); *G06Q 10/04* (2013.01); *G06Q 30/0201* (2013.01); *G06Q 50/26* (2013.01); *G07C 9/38* (2020.01); *H04W 4/021* (2013.01)

(58) Field of Classification Search
CPC .............. H04W 4/029; G06Q 30/0201; G06K 9/00778

USPC .......................................................... 235/376
See application file for complete search history.

(56) References Cited

U.S. PATENT DOCUMENTS

| | | |
|---|---|---|
| 2002/0126013 A1 | 9/2002 | Bridgelall |
| 2011/0080262 A1 | 4/2011 | Richardson et al. |

(Continued)

FOREIGN PATENT DOCUMENTS

WO    2017021853 A1    2/2017

OTHER PUBLICATIONS

Preliminary search report issued in corresponding French Patent Application No. FR1763428 dated Jul. 11, 2018, 4 pages.

(Continued)

*Primary Examiner* — Toan C Ly
(74) *Attorney, Agent, or Firm* — Pearne & Gordon LLP

(57) ABSTRACT

The invention relates to a system (1) for managing a mass gathering on a geographical location, said system including an analytical platform (100) associated with a plurality of image acquisition devices (10) and network sensors (20) distributed over the gathering geographical location, the analytical platform (100) including:
- a data acquisition module (130), able to acquire participant distribution data generated from data from the plurality of image acquisition devices (10) and to acquire participant distribution data generated from data from the plurality of network sensors (20), and
- a data processing module (140) able, from the acquired distribution data, to calculate based on a supervised or unsupervised learning correction model, a corrected distribution data item of the participants in said gathering.

13 Claims, 6 Drawing Sheets

Figure 1:
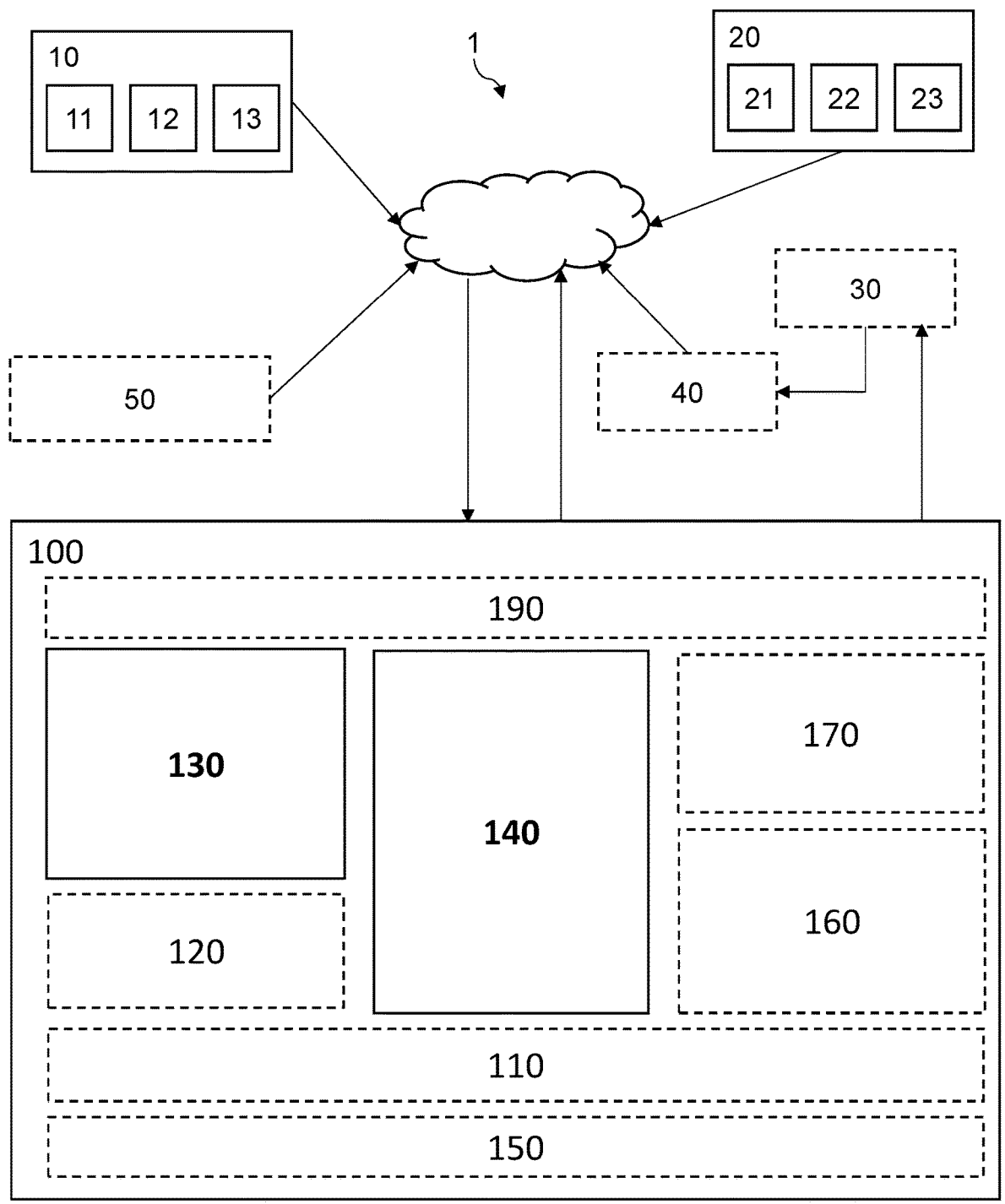

(51) Int. Cl.
  *G06K 9/62* (2006.01)
  *H04W 4/021* (2018.01)

(56) References Cited

U.S. PATENT DOCUMENTS

| | | | |
|---|---|---|---|
| 2014/0079297 A1* | 3/2014 | Tadayon | G06K 9/00 |
| | | | 382/118 |
| 2016/0315682 A1 | 10/2016 | Liu et al. | |
| 2017/0018042 A1* | 1/2017 | Pudipeddi | G06Q 50/12 |
| 2017/0053171 A1 | 2/2017 | Buehler | |

OTHER PUBLICATIONS

Marsden, et al. "ResnetCrowd: A Residual Deep Learning Achitecture for Crowd Counting, Violent Behaviour Detection and Crowd Density Level Classification." Insight Center for Data Analytics. Dublin University, Ireland. May 30, 2017. 8 pages.

Aziz, et al. "Automated Solutions for Crowd Size Estimation." Social Science Computer Review. Sage Publishing. Sep. 11, 2017. 22 pages.

Pan, et al. "An Improved Convolutional Neural Network on Crowd-Density Estimation." School of Information Security, Shanghai Jiao Tong University, China. ITM Web of Conferences. Nov. 21, 2016. 4 pages.

Cong Zhang, et al. "Cross-scene Crowd Counting via Deep Convulational Neural Networks." 2015 IEEE Conference on Computer Vision and Pattern Recognition (CVPR), IEEE. Jun. 7, 2015. 10 pages.

Dr. Saeed, et al. "A Hybrid Intelligence of Harmony Search Algorithm and Neural Network for Crowd Density Estimation." International Journal of Computer Science and Information Technology and Security. vol. 7, No. 4. Jul.-Aug. 2017. 6 pages.

Ramesh, et al. "A Novel Wireless Sensor Network Architecture for Crowd Disaster Mitigation." 2012 8th International Conference on Wireless Communications, Networking, and Mobile Computing (WICOM 2012). Shanghai, China. Sep. 21-23, 2012. 4 pages.

International Search Report and Written Opinion issued in corresponding application No. PCT/FR2018/053560 dated Mar. 14, 2019, 13 pages.

"Small Cell." Wikipedia. Accessed Aug. 20, 2020. 2 pages. https://en.wikipedia.org/wiki/Small_cell.

"Data Fusion." Wikipedia. Accessed Aug. 20, 2020. 3 pages. https://en.wikipedia.org/wiki/Data_fusion.

* cited by examiner

SYSTEM AND METHOD FOR MANAGING A MASS GATHERING

The invention relates to the field of mass gathering management, and more particularly to a management system that can be used to quantify, predict, and track the movements of people and their behavior at a mass gathering. The invention relates to a method for managing a mass gathering further capable of using the generated quantitative data to provide crowd management solutions to ensure the safety of the participants in the mass gathering and, for example, to reduce the risk of accidents associated with crowd movements.

Prior Art

Large gatherings, also called mass events or mass gatherings, are characterized by a large number of people attending or participating in a common event, such as a pilgrimage, a sporting competition or a concert. With the increase in population, communication and democratization of transport over long distances, these large gatherings are becoming more and more frequent and concern people increasingly numerous and diverse.

Events likely to bring together the largest number of people are often pilgrimages such as the Hajj which is the largest annual population gathering in the world, the Kumbh Mela which is the largest gathering of Hindus in the world or masses of the pope often bringing together several million people. Thus, for the year 2011, the Central Department of Statistics and Information of the Kingdom of Saudi Arabia has identified nearly 3 million pilgrims for the Hajj. The Hajj pilgrimage brings together several million people every year over only a few days. Despite a control exerted by the Hajj authorities, the number of pilgrims over the Hajj period exceeds 2.5 million each year. On the rise, it is likely that this number will reach 10 million visitors a year in a few years. In addition to pilgrimages, events likely to bring together a significant crowd are for example sporting events (for example the World Cup or the Olympic Games) or cultural events (for example Universal Exhibition). For example, for the 2024 Olympic Games in France, the average number of spectators expected during the two weeks of the Olympic Games is estimated to more than three million, including 500,000 foreign visitors.

However, such gatherings have increased probabilities of risks, especially because of possible movements of the crowd often associated with a congestion of the crowd. Indeed, the crowd can be static or moving and, under the effect of the collective mass, it can change its attitude very quickly therefore leading to phenomena called crowd movements. In addition, mass gatherings complicate access and action of emergency services. In the end, mass gatherings increase the chances of a dangerous event happening. These accidents occur in particular because of a lack of data and statistics on the number of participants and their distribution, a lack of a strict reliable movement estimate, an inadequate management of space available and the unpredictable behavior of the crowd. In the last ten years, several thousand people have died in disasters associated with poor crowd management.

Thus, the authorities in charge of monitoring large gatherings, responsible for managing and controlling the crowd in public places are faced with a difficult task since a single error in the management of the crowds can lead to stampedes and enormous loss of life. In particular, crowd controlling has become a major issue during mass gathering with many participants who can die in crowd movements, sources of accidents, especially in congested areas.

Generally, the techniques most used for crowd management are techniques associated with entry and exit controls as well as the creation of temporary channels capable of controlling the crowd. Nevertheless, such a control is not adapted to all gatherings and some gatherings require to maintain a necessary freedom of movement or circulation. Furthermore, the existence of checkpoints does not allow for a sufficient management of the crowd because of crowd movements can occur between the checkpoints. In addition, the checkpoints themselves can become congestion points.

Other methods for tracking and managing crowds have been proposed. For example, a method based on the use of a passive RFID tag for identifying the pilgrims in holy areas during the Hajj has been proposed. In the context of this technology, upon presentation of the tag to a portable reader, all the information pertaining to the pilgrim in possession of the tag will be displayed on the reader's screen. Nevertheless, this technology has detection failures especially in the context of a large density of people or when said people are in a vehicle. This principle has been particularly detailed in document US20110080262 which describes a system for locating a specific subject among a number of possible subjects having an RFID tag providing an RFID reader a unique identification code. A database containing information about the subscribers, including a list of RFID identification codes associated with the subjects of interest, is included in the system. A real-time location tracking system based on a hybrid Bluetooth/RFID technology in document US20020126013 or a wireless sensor network for a system for tracking and monitoring pilgrims using GPS modules and an RF technology, have also been proposed.

Despite these technologies, there is a difficulty to quantify, predict and track the movements of people and their behavior during a mass gathering. For example, there is a lack of reliable information on the number of participants, their movements and their behavior during the mass gatherings, making it difficult for the competent authorities to make decisions. Yet, this indecision can create heavy congestion for example due to the convergence of large groups of pilgrims especially at the Haram during the Hajj period.

There is therefore a need for a system or a method for improving crowd management during mass gatherings. A better crowd management first requires a better analysis of its distribution on the gathering location. In addition, there is also a need for a system or a method for ensuring a high level of comfort for the participants with, for example, a dynamic optimization of the use of resources to ensure the safety and hygiene during the mass gathering.

Technical Problem

The invention therefore aims to overcome the disadvantages of the prior art. In particular, the object of the invention is to provide a system for managing a mass gathering, said system allowing to count more precisely the number of participants in said gathering and more particularly to access distribution data on the geographical location. The invention also aims to provide a dynamic management of the mass gathering according to the generated participant distribution data.

The invention also aims to provide a method for managing a mass gathering, welcoming at least several thousand people, on a gathering geographical location, wherein said method can be used to provide reliable quantitative data and crowd management services capable of reducing the risks associated with the crowd movements and to improve the comfort of the participants.

BRIEF DESCRIPTION OF THE INVENTION

To this end, the invention relates to a system for managing a mass gathering on a geographical location, said system including an analytical platform associated with a plurality of image acquisition devices and network sensors distributed over the gathering geographical location, the analytical platform including:
- a data acquisition module, able to acquire participant distribution data generated from data from the plurality of image acquisition devices and to acquire participant distribution data generated from data from the plurality of network sensors, and
- a data processing module able, from the acquired distribution data, to calculate based on a supervised or unsupervised learning correction model, a corrected distribution data item of the participants in said gathering.

There is a high rate of error in estimating the distribution of the participants in a mass gathering when the distribution is estimated with the automated methods known from the prior art (camera, RFID . . . ). The system according to the invention allows to obtain a corrected distribution data item much closer to the actual distribution values. Thus, the invention has the advantage of allowing to set up actions for managing a mass gathering based on correct distribution values. Thus, the system according to the invention allows, in particular, to calculate in real time, and to predict the density of people (for example pilgrims) according to the location considered so as to, if necessary, open emergency access, contain new flows of crowds and thus prevent risks associated with the crowd movements (collisions).

Such a system is particularly useful in the management of pilgrimages such as the small and the great pilgrimage to Mecca, especially via a better management of the crowd movements when moving. It allows, for example, to facilitate the channeling and controlled movement of the crowd and reduces the likelihood of accidents caused by a possible congestion.

According to other optional features of the system:
- the network sensors are able to connect to electronic devices via at least one communication protocol selected from: Wi-Fi, Bluetooth and GSM. Indeed, these protocols are widely used and compatible with most electronic devices that can be worn by participants. Thus, a system associated with such sensors could acquire and interpret the data generated by communicating electronic devices worn by participants such as mobile phones, tablets, connected watches or connected bracelets.
- the correction model is selected from the following models: FP-Growth, Apriori, hierarchical partitioning, k-average partitioning, neural network classification, decision trees and logistic regression. These specific models allow for the production of distribution data closest to reality.
- it further includes a pre-processing module configured to generate, from raw data from the plurality of network sensors, participant distribution data. The pre-processing module is, for example, at the analytical platform.
- it includes a data storage module able to store the acquired distribution data and the corrected distribution data. The storage module is further able to manage logging of said data. Such a module is advantageously configured to keep previous data, organized and accessible on request. This allows, on the one hand, to compile statistics on the mass gathering and, on the other hand, to implement a learning model based on these data for a constant improvement of the performance of the platform.
- the analytical platform further includes a learning module able to implement a supervised or unsupervised learning model so as to:
  - improve the correction model used for calculating the corrected distribution data,
  - improve the one or more pre-processing models used for generating distribution data from the raw data from image acquisition devices or network sensors, and
  - analyze the corrected distribution data.

Thus, in addition to a dynamic management of the gathering based on accurate participant distribution data updated in real time or almost in real time, the system according to the invention allows to establish predictive data based on the data measured in real time and previous data. Thus, the system is not only able to react and adapt quickly to a risk situation, but it can anticipate it and avoid its occurrence.
- the learning module is configured to analyze the corrected distribution data so as to generate predictive data selected from:
  - critical distribution thresholds, preferably by area, beyond which actions may be initiated so as to reduce the risk of a crowd movement,
  - predicted distribution data, as a function of time, of participants in said gathering,
  - critical distribution patterns, preferably between different areas, in the presence of which actions may be taken to reduce the risk of a crowd movement.

The analytical platform includes an analysis module able to compare, preferably in real time, the corrected distribution data on said gathering geographical location to predetermined critical distribution thresholds and to generate an alert based on the comparison result. This allows the system to identify potential risks and for example bottlenecks.
- the data processing module is able to generate distribution data selected from:
  - the total amount of participants on the geographical location or on part of the geographical location,
  - the density of participants on the geographical location or on part of the geographical location, and
  - the number of people entering and leaving the geographical location or part of the geographical location.
- it further includes at least one access control device configured to control access between different areas of the geographical location. This is particularly useful when there is a risk of a crowd movement.
- the invention further relates to a method for managing a mass gathering on a geographical location, said method being implemented by a system including an analytical platform and, on the geographical location, a plurality of image acquisition devices and network sensors, said platform including a data acquisition module and a data processing module, and said method being characterized in that it includes the following steps:
  Acquiring, via the acquisition data module, participant distribution data generated from data from the plurality of image acquisition devices and participant distribution data generated from data from the plurality of network sensors;

Calculating, via the data processing module, at least one corrected distribution data item of the participants in said gathering, from the acquired distribution data and based on a supervised or unsupervised learning model.

Other advantages and characteristics of the invention will appear upon reading the following description given by way of illustrative and non-limiting example, with reference to the appended figures which represent:

FIG. 1, a schematic representation of the system for managing a mass gathering according to the invention, the dashed elements are optional.

Figure 2:
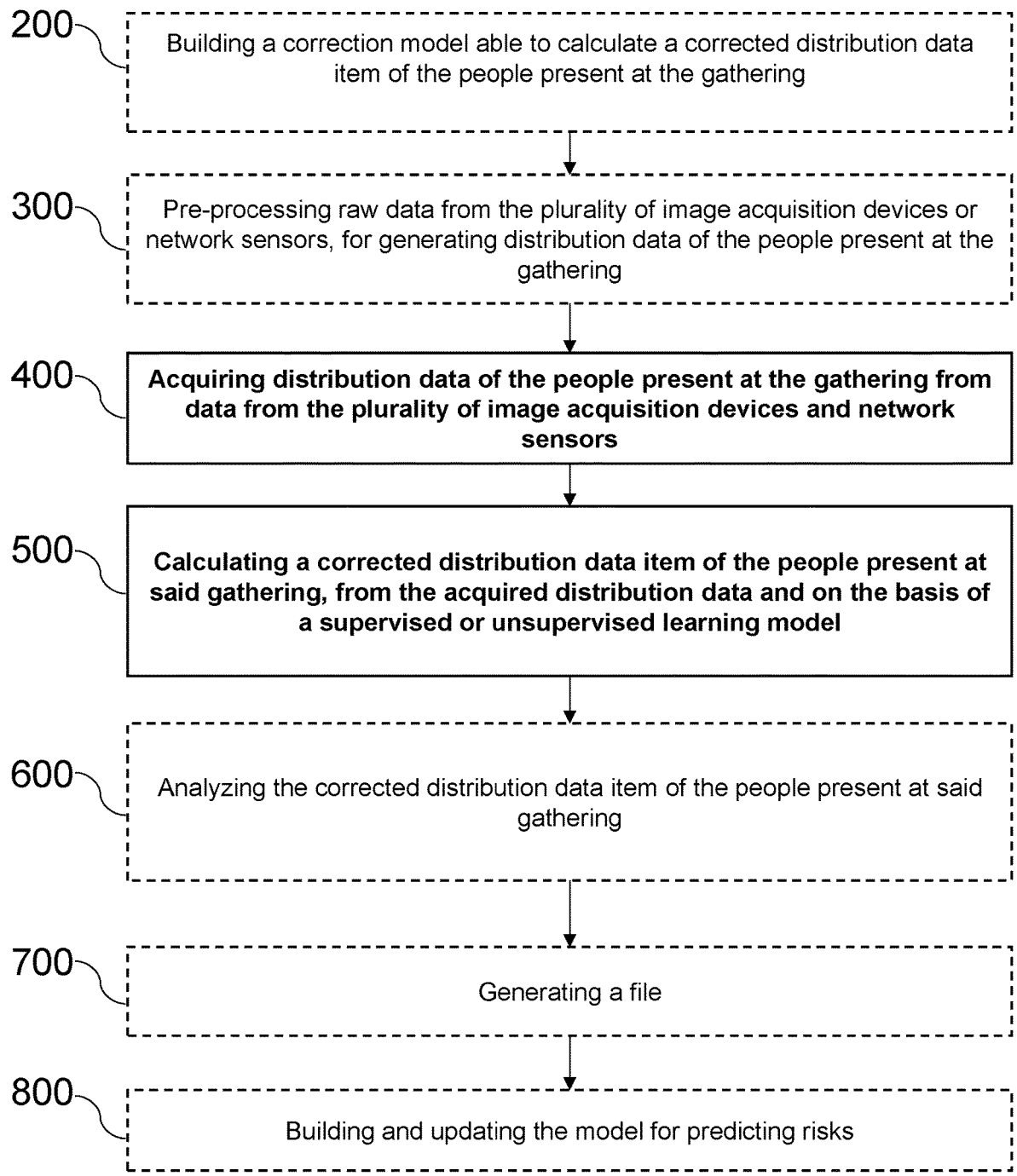
Figure 3:
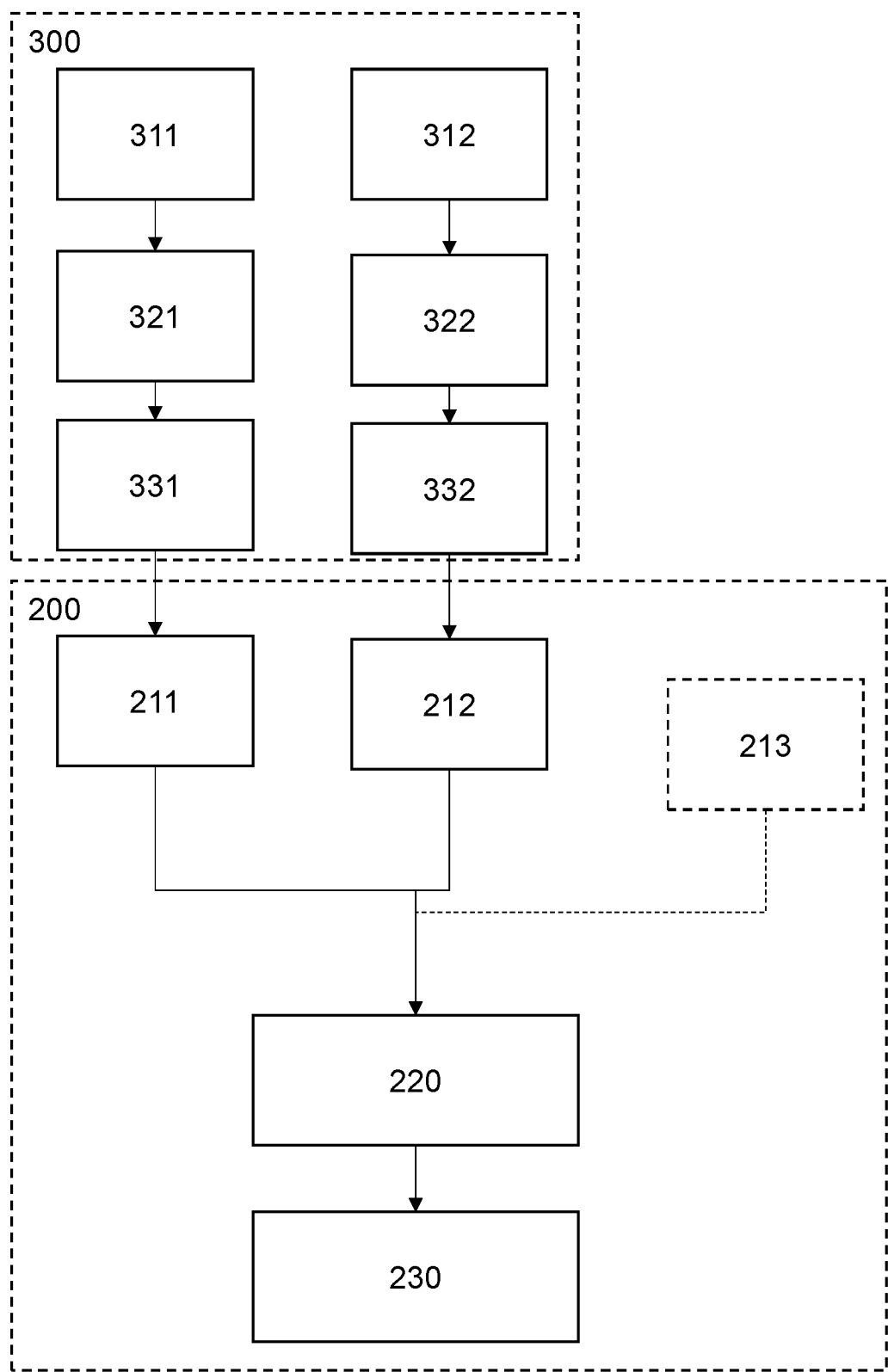
Figure 4:
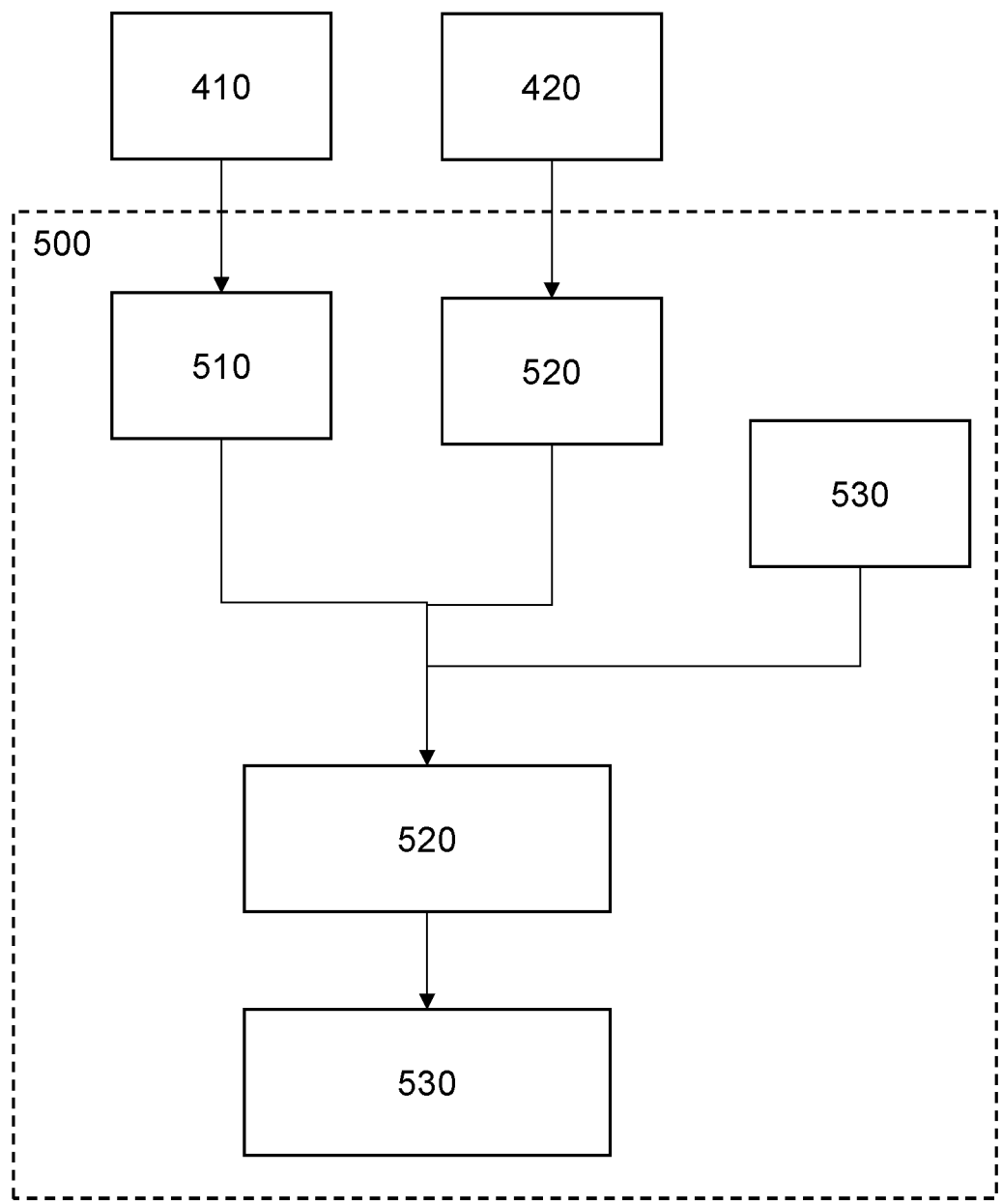
Figure 5:
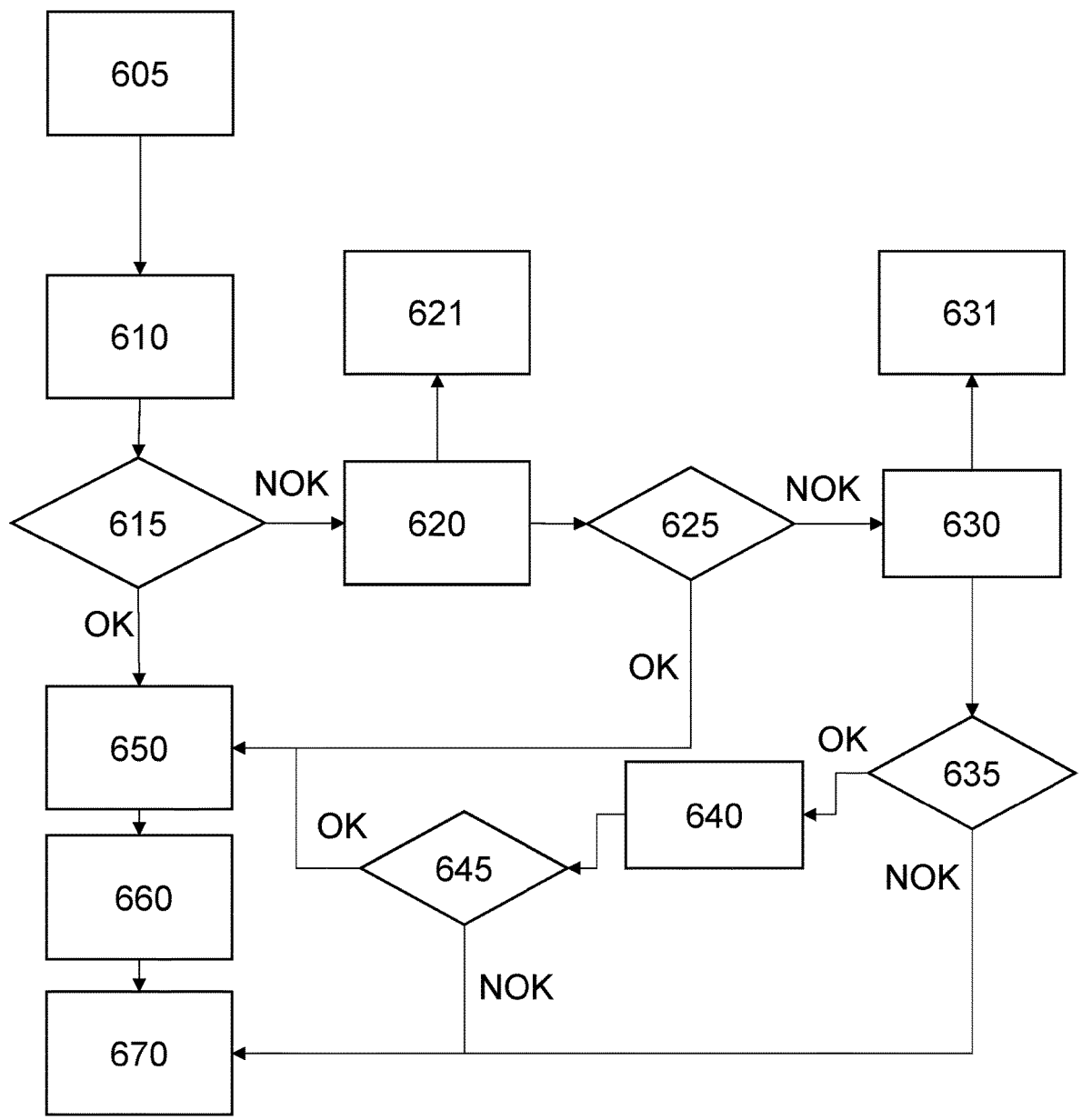
Figure 6:
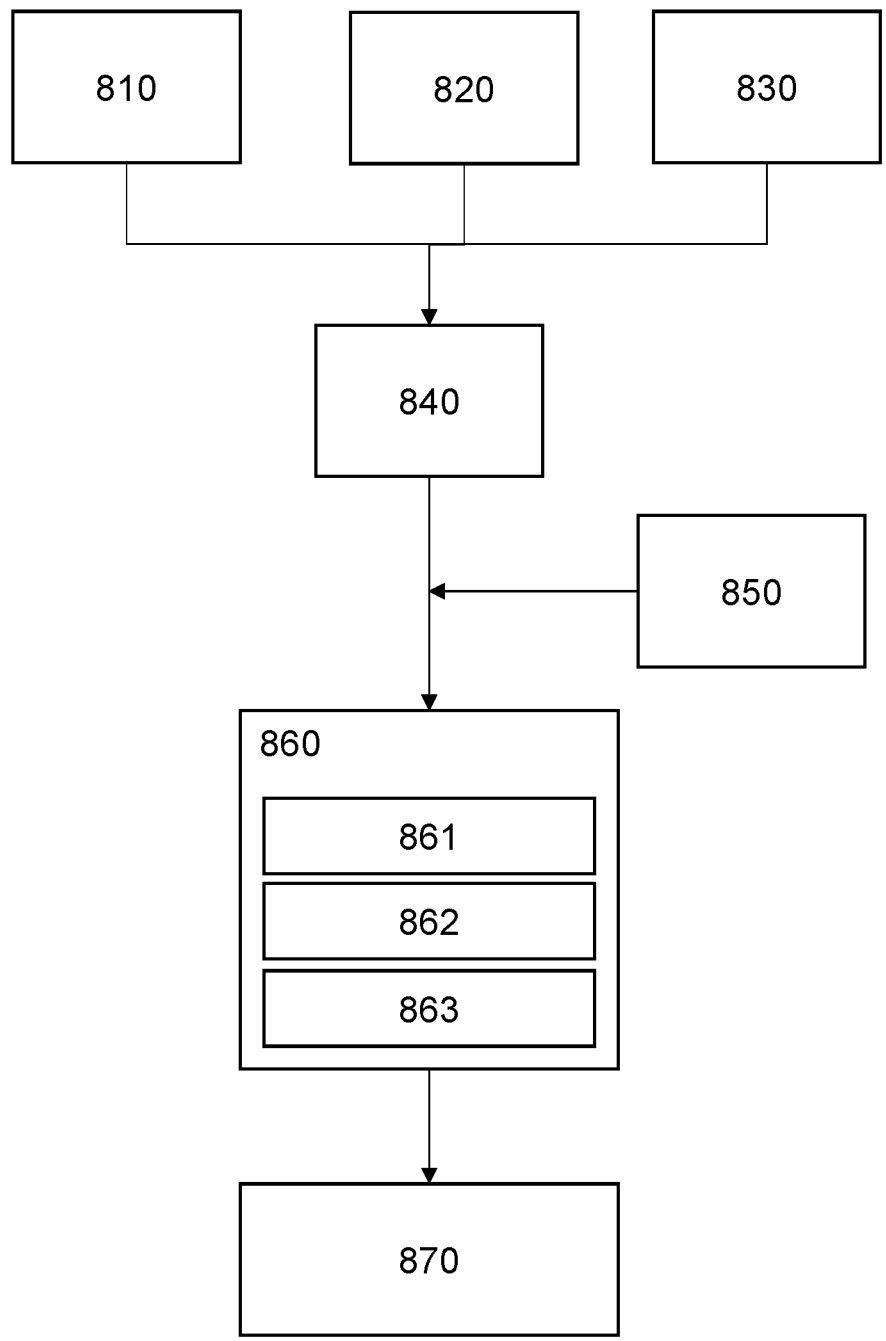

FIG. 2, a schematic representation of the method for managing a mass gathering according to the invention, FIG. 3, a schematic representation of a step of building the learning correction model according to an embodiment of the invention, FIG. 4, a schematic representation of a step of calculating a corrected distribution data item according to an embodiment of the invention, FIG. 5, a schematic representation of a step of analyzing the corrected data according to an embodiment of the invention, FIG. 6, a schematic representation of a step of building and updating a model for predicting the distribution of participants and the crowd movement according to an embodiment of the invention.

DESCRIPTION OF THE INVENTION

In the following description, by "geographical location" is meant, a place that can be defined by its size, be constituted by outside areas and/or inside areas.

The term "mass gathering", according to the invention, corresponds to a planned or spontaneous event, preferably planned, which will attract a number of participants likely to considerably solicit resources in terms of planning and action of the administrators or the host country. The Olympic Games, the Hajj and other major sporting, religious or cultural events are examples thereof.

The term "distribution" refers, according to the invention, to an amount or to a movement of people. The amount may be expressed according to several dimensions such as a density (for example person/$m^2$), a total number (for example in hundred people), a percentage (for example number of people/capacity of the area). The movement corresponds to an amount in terms of entry in and exit from the geographical location or part of the geographical location. Thus, the "distribution data item" according to the invention corresponds to one or more values.

By "parameter" is meant, within the meaning of the invention, a value obtained by transformation of raw data and that can then be used within a model. This particularly applies to the transformation of a series of images of a video or to the transformation of a series of values obtained via a network sensor.

By "critical distribution threshold" is meant, within the meaning of the invention, a predetermined value of the distribution of participants or of a sensor measurement beyond which there is a significant risk of a crowd movement.

By "model" or "rule" or "algorithm" is to be understood, within the meaning of the invention, a finite sequence of operations or instructions allowing to calculate a value by means of a classification or a partitioning of the data within previously defined groups Y and to assign a score or to rank one or more data within a ranking. Implementing this finite sequence of operations allows, for example, to assign a tag Y to an observation described by a set of characteristics or parameters X thanks, for example, to the implementation of a function f likely to reproduce Y, having observed X.

$Y=f(X)+e$ where e symbolizes the noise or measurement error.

By "supervised learning method" is meant, within the meaning of the invention, a method for defining a function f from a base of n tagged observations $(X_{1 \ldots n}, Y_{1 \ldots n})$ where $Y=f(X)+e$. By "unsupervised learning method" is meant, a method for prioritizing the data or dividing a dataset into different homogeneous groups, with the homogeneous groups sharing common characteristics and without the observations being tagged.

By "maintenance" or "maintenance action" is meant, within the meaning of the invention, an activity for repairing, recharging, cleaning or replacing a facility. By "facility" is meant, within the meaning of the invention, a building, a room, housing, but also equipment (for example water dispenser, furniture). By "maintenance resources" is meant, people, also called "maintenance agent", qualified to carry out maintenance actions or devices that may be necessary for carrying out maintenance actions.

By "process", "calculate", "determine", "display", "extract", "compare" or more broadly "executable operation" is meant, within the meaning of the invention, an action carried out by a device or a processor unless the context indicates otherwise. In this regard, the operations relate to actions and/or processes of a data processing system, for example a computer system or an electronic computing device, which manipulates and transforms the data represented as physical (electronic) quantities in the memories of the computer system or other devices for storing, transmitting or displaying information. These operations may be based on applications or software.

The terms or expressions "application", "software", "program code", and "executable code" mean any expression, code or notation, of a set of instructions intended to cause a data processing to perform a particular function directly or indirectly (for example after a conversion operation to another code). Program code examples may include, but are not limited to, a subprogram, a function, an executable application, a source code, an object code, a library and/or any other sequence of instructions designed for being performed on a computer system.

By "processor", within the meaning of the invention, is meant at least one hardware circuit configured to perform operations according to instructions contained in a code. The hardware circuit may be an integrated circuit. Examples of a processor include, but are not limited to, a central processing unit, a graphics processor, an application-specific integrated circuit (ASIC), and a programmable logic circuit.

By "coupled", within the meaning of the invention, is meant connected, directly or indirectly, with one or more intermediate elements. Two elements may be coupled mechanically, electrically or linked by a communication channel.

In the following description, the same references are used to designate the same elements.

The invention relates to a system or to a method for managing a mass gathering. Events likely to bring together the greatest number of people are often pilgrimages, sporting events, protests or cultural events. The present invention, while applicable to many mass gatherings, will be illustrated more particularly in the context of a pilgrimage to Mecca, for example during the great pilgrimage or the small pilgrimage. Indeed, the pilgrimage to Mecca represents about five million visitors each year in the cities of Mecca and Medina in Saudi Arabia. These visitors meet in particular during the annual ritual of Hajj which is performed over a specific number of days of the Dhul-Hijja month of each lunar year, more particularly during the first 12 days. In 2017, the first day of the Dhul-Hijja month of the lunar year 1437 was Aug. 23, 2017.

The Hajj pilgrimage extends on a geographical location corresponding to Mecca, namely more than 1000 km$^2$. During this pilgrimage, Hajj participants, also known as Hajis, will pray five times a day in the same gathering places and will proceed to the cults as explained. For example, they will have to go around the Kaaba seven times, walk seven times between Safā and Marwah, drink at the Zamzam spring and then go to the place-name "Mina", 4 km from Mecca, and say the afternoon (asr), evening (maghreb and icha) and morning (fajr) prayers. They will also have to go to Arafat Mountain and say the noon and afternoon prayers and then go to "Muzdalifah" for the evening prayers. The next day, the pilgrim returns to Mina to perform the prescribed rites, namely a journey of about 17 km (round trip). In addition, the pilgrims usually visit the Mosque of the Prophet Muhammad (PSSL), Al-Masjid an-Nabawī, in Medina. Thus, with several million pilgrims traveling this territory over a very short period and visiting several facilities, the administrations in charge of managing the maintenance of the Mecca facilities are under heavy pressure. Thus, the Hajj pilgrimage welcomes millions of pilgrims performing the same actions at the same time, thus leading to a high density of pilgrims and all these actions are distributed over only a few days on an area of several square kilometers. In this regard, managing such an event represents an exceptional challenge, especially regarding the management of the participants within the geographical location concerned. Indeed, it is necessary, on the one hand, to ensure the safety of the participants by predicting and limiting the antagonistic movements of the crowds, but also to ensure their comfort. This is possible by setting up a dynamic management of the gathering based on precise data of the distributions of the participants updated in real time or almost in real time. Thus, the actions for the safety and the comfort of the participant (maintaining the cleanliness of the facilities and the availability of the equipment) are perfectly adapted to the situation.

As shown in FIG. 1, the invention relates, according to a first aspect, to a system 1 for managing a mass gathering that can, preferably, welcome at least several thousand people, preferably more than 100,000 people, more preferably over a million people.

The geographical location within the scope of the invention may be considered as a whole, but also divided into several parts, spaces or areas. In fact, in the context of tracking the distribution, the distribution data will preferably be processed areas by areas, advantageously with tracking the movements between the areas.

In addition, the geographical location includes a plurality of facilities. The facilities may, for example, be selected from: places of worship, sanitary premises, housings, parks, but also from the equipment present within these buildings or spaces such as for example benches, tables, dispensers (for example of water) and carpets. In the context of the Mecca pilgrimage, these facilities are, for example, places or structures such as the Kaaba, Safā, Marwah, the Zamzam spring, the place-name "Mina", "Muzdalifah", the mosque of the Prophet Mohamed (PSSL), Al Masjid Al-Nabawi, in Medina or equipment such as carpets, dispensers of plastic bags for shoes or water dispensers. The geographical location includes at least two facilities, the maintenance of which is to be managed, for example at least ten facilities, preferably at least twenty facilities, more preferably at least fifty facilities, and still more preferably at least one hundred facilities. Thus, the implementation of a dynamic maintenance management method in such a context is not comparable to conventional problems of household activities.

As shown in FIG. 1, the system 1 according to the invention includes an analytical platform or analytical computer platform 100. This analytical platform 100 is more particularly in charge of processing information, planning, generating instructions and tracking maintenance.

To this end, this analytical platform 100 is associated with a plurality of image acquisition devices and network sensors. These image acquisition devices and network sensors are distributed over the geographical location so that data representative o the status on the geographical location can be provided.

The analytical platform 100 is associated with a plurality of image acquisition devices 10, but the system may also comprise said plurality of image acquisition devices.

The image acquisition devices 11, 12, 13, 14 are all devices capable of storing and transmitting an image. For example, the image acquisition devices 11, 12, 13, 14 are selected from: cameras, visible-light cameras, infrared thermal cameras, bi-spectral cameras, 3D cameras and/or cameras on board drones. Advantageously, the image acquisition devices 10 include 3D cameras, capable of scanning an area at 360.

The plurality of image acquisition devices 10 advantageously corresponds to a quantity sufficient to allow the acquisition of a reliable distribution data item. For example, the system 1 may include or be associated with between 10 and 2,000 image acquisition devices 11, 12, 13, 14. Advantageously, the plurality of image acquisition devices 10 corresponds to a density of image acquisition devices 11, 12, 13, 14 per 100 m$^2$ between 1 and 100 image acquisition devices.

Thus, the analytical platform 100 is associated with a plurality of network sensors 20, but the system may also comprise said plurality of network sensors.

The network sensors 20 are all devices capable of storing and transmitting a piece of information about a network data item. Preferably, the network sensors 20 are able to connect to devices via at least one communication protocol selected from: Wi-Fi, Bluetooth and GSM. Preferably, the network sensors 20 are able to connect to communicating devices via at least the communication protocols: Wi-Fi, Bluetooth and GSM. Indeed, today, most phones, laptop computers and portable electronic devices use wireless communication, particularly Bluetooth and Wi-Fi.

Thus, the network sensors are advantageously able to acquire a set of information on the communicating electronic devices located in their range. The information acquired may for example correspond to: a MAC ("Media Access Control", Anglo-Saxon terminology) address data item, an IMEI ("International Mobile Equipment Identity", Anglo-Saxon terminology) data item, a GSM ("Global System for Mobile Communications", Anglo-Saxon terminology) network access provider identifier, the CID (Cell ID in Anglo-Saxon terminology) reception base or the signal strength.

Preferably, these data are anonymized and are identified by a unique identifier which may for example be a MAC address data item of the electronic communication device or IMEI identifier data item.

The plurality of network sensors 20 advantageously corresponds to a quantity sufficient to allow the acquisition of a reliable distribution data item. For example, the system 1 may include, or be associated with, between 10 and 2,000 network sensors 20, preferably between 15 and 200 network sensors. Advantageously, the plurality of network sensors corresponds to a density of sensor networks 20 per 10,000 $m^2$ between 1 and 10.

As shown in FIG. 1, the analytical platform 100 includes a data acquisition module 130. This data acquisition module 130 is advantageously able to acquire, or load, participant distribution data generated from data from the plurality of image acquisition devices 10 and to acquire, or load, participant distribution data generated from data from the plurality of network sensors 20.

As shown in FIG. 1, the analytical platform 100 includes a data processing module 140. From the distribution data acquired by the acquisition module 130, this data processing module 140 is advantageously able to calculate, based on a supervised or unsupervised learning correction model, a corrected distribution data item of the participants in said gathering.

The correction model is, for example, selected from the following models: FP-Growth, Apriori, hierarchical partitioning, k-average partitioning, neural network classification, decision trees and logistic regression.

Preferably, the corrected participant distribution data item corresponds to at least one data item selected from the following data:
- a data item relative to the amount of participants, such as that the total amount or density of people present on the geographical location or on part of the geographical location. This data item gives a piece of information on the volume of participants.
- a data item relative to the movements of participants, such as the number of people entering and leaving the geographical location or part of the geographical location. This data item gives a piece of information on the flow of participants.

The system 1, or more particularly as shown in FIG. 1, the analytical platform 100, can also include a pre-processing module 120. This pre-processing module 120 may be configured to generate participant distribution data from raw data from the plurality of network sensors and/or the plurality of image acquisition devices.

FIG. 3, for example, shows a step 300 of pre-processing raw data from the plurality of image acquisition devices or network sensors 20 for generating distribution data of the participants in the gathering. In this embodiment, the pre-processing begins with a step 311 of acquiring image raw data and/or a step 312 of acquiring network communication raw data.

These raw data are then processed in steps 321 and 322, from image or network parameter, for generating one or two participant distribution data. These generated distribution data can then be stored on a memory during steps 331 and 332.

Thus, the analytical platform 100 may also include a data storage module 150.

This module is more particularly able to store the acquired distribution data, the corrected distribution data and the predicted distribution data. This module may also be used more widely for all the data acquired and generated by the analytical platform. In addition, this module is advantageously configured to create and manage logging of said data.

To this end, the storage module 150 may comprise a transient memory and/or a non-transient memory. The non-transitory memory may be a medium such as a CD-rom, a memory card, or a hard disk, for example hosted by a remote server. The storage module 150 is, furthermore, able to manage logging of the data received or generated by the analytical platform 100. Advantageously, the storage module 150 has an architecture of the LAMBDA-, KAPPA- or SMACK Architecture-type.

As previously mentioned, in addition to a dynamic management of the gathering based on accurate participant distribution data updated in real time, allowing it to react and adapt quickly to a risk situation, the system according to the invention can also anticipate a risk situation and avoid its occurrence. To this end, the analytical platform 100 may also include a learning module 110.

In addition, the learning module 110 is for example configured to create and update a model for generating the distribution data of the participants from raw data from the plurality of network sensors and/or the plurality of image acquisition devices. This module 110 may also be configured to create and update the correction model used to calculate the corrected distribution data item. This module 110 may also be configured to create and update the corrected distribution data interpretation model which is for example used to calculate a crowd movement probability, preferably by area depending on the distribution data or a participant distribution prediction model from corrected distribution data.

The learning module 110 is able to implement algorithms based on supervised or unsupervised learning methods. Thus, advantageously, the analytical platform 100 is configured to implement the input data in one or more algorithms, preferably previously calibrated. These algorithms are, for example, selected from a distribution data generation model algorithm, a correction model algorithm, a corrected distribution data interpretation model algorithm. In addition, these algorithms may have different versions depending on the time of a gathering period. For example, in the context of the pilgrimage, three periods may be taken into account: the Hajj or great pilgrimage, the small pilgrimage and the rest of the year. This allows to refine the predictions resulting from the models. These algorithms may have been built from different learning models, especially partitioning, supervised or unsupervised. An unsupervised learning algorithm may, for example, be selected from an unsupervised Gaussian mixing model, a hierarchical ascending classification (Hierarchical clustering Agglomerative in Anglo-Saxon terminology), a hierarchical descending classification (Hierarchical clustering divisive in Anglo-Saxon terminology). Alternatively, the algorithm relies on a supervised statistical learning model configured to minimize a risk of the scheduling rule and thus to obtain more efficient prediction rules. In this case, the determination calculation and estimation steps may be based on a model, trained on a dataset, and configured to predict a tag. For example, for calibration purposes, it is possible to use a dataset representative of a situation, the tag of which is known, for example the number of participants in a manually counted area. The dataset may also include multiple tags. The algorithm may be derived from the use of a supervised statistical learning model selected, for example, from the kernel methods (for example Large Margin Separators—Support Vector Machines SVM, Kernel Ridge Regression) described for example in Burges, 1998 (Data Mining and Knowledge Discovery. A tutorial on Support Vector Machines for pattern recognition), the pool-based methods (for example decision trees) described for example in Brieman, 2001 (Machine Learning. Random Forests), FP-Growth, Apriori, hierarchical clustering, k-means clustering, decision trees, logistic regression or the neural networks described, for example, in Rosenblatt, 1958 (The Perceptron: a probabilistic model for information storage and organization in the brain).

As shown in FIG. 1, the analytical platform 100 may also include an analysis module 160.

This analysis module 160 is especially able to compare, preferably in real time, the corrected distribution data on said geographical location of a gathering to predetermined critical distribution thresholds and to generate an alert based on the result of the comparison. This allows the system to identify potential risks and for example bottlenecks.

The analysis module 160 is also advantageously configured to generate, preferably in real time, crowd movement patterns and to compare them to pre-stored patterns. This allows to identify potential risks despite the absence of critical thresholds being exceeded.

The analytical platform 100 may advantageously include an analysis module 160 configured to generate files including analyzed data, preferably as a function of time, selected from:
the actual and/or predicted distribution of the participants in said gathering, that is to say the total amount of participants on the geographical location or on part of the geographical location, the density of participants on the geographical location or on part of the geographical location, and/or the number of people entering and leaving the geographical location or part of the geographical location;
Actual and/or predicted critical events, such as crowd movements;
Actual and/or predicted medical needs;
Actual and/or predicted security needs; or
Actual and/or predicted logistical needs.

These files are preferably generated from logged data. These files can then be processed by representation applications in order to highlight the relevant information ("heat maps" type format). Thus, the analysis module is able to generate statistical data for optimizing the maintenance actions. It also reduces waste of resources.

The analysis module is further able, in case an alert is generated, to extract a portion of images from the image acquisition devices 10 and to transmit them to a supervision module 170. This may be necessary to validate or not the risk or the occurrence of a crowd movement or any other incident.

Thus, the analytical platform 100 may include a supervision module 170 comprising a display device configured to display for example at least one piece of information on the actual or predicted distribution data of the participants in the mass gathering, data from the image acquisition devices 10.

The predicted distribution data are preferably predicted as a function of time. Thus, the learning module may be configured to predict, preferably areas by areas, distribution data predicted over 1 hour and with a data item every 10 minutes so as to be able to follow the evolution of predicted distribution data.

Thus, the system may include an access control device 30, preferably associated with the analytical platform. The access control device 30 being able to control access between different areas of the geographical location, for example when there is a risk of a crowd movement.

The access control device 30 may for example be a moving partition, a closure system, a light or a display device indicating a right of access to an area or a security portal that can limit access to an area.

The access control device 30 may also be coupled to the individual electronic devices 40, being preferably in the form of electronic bracelets, with said individual electronic devices including an individual storage module able to store personal data about a person and a communication module able to communicate with an access control device.

The system according to the invention is then advantageously configured to take into account personal data of the individual electronic devices 40 to activate or not the access control devices.

The system may also be configured to take into account data communicated by the individual electronic devices 40 to calculate the distribution data item of the participants in said gathering.

In addition, the analytical platform 100 may include a communication module 190. Thanks to this communication module, the platform 100 is able to communicate with the plurality of network sensors 20 and image acquisition devices 10, access control devices 30, individual electronic devices 40 or any other device 50 likely to exchange information with the analytical platform. The communication module 190 is configured to receive and transmit information to remote systems such as sensors, tablets, telephones, computers, or servers. The communication module allows to transmit the data on at least one communication network and may comprise a wired or wireless communication. Preferably, the communication is operated via a wireless protocol such as Wi-Fi, 3G, 4G, and/or Bluetooth. These data exchanges may take the form of sending and receiving files, preferably encrypted and associated with a specific receiver key. The communication module 190 is further able to allow communication between the platform 100 and a remote terminal, including a client. The client is generally any hardware and/or software likely to access the analytical platform 100.

In addition, the system according to the invention may include one or more human-machine interfaces. The human-machine interface, within the meaning of the invention, corresponds to any element allowing a human being to communicate with a computer, in particular, and without this list being exhaustive, a keyboard and means allowing in response to orders entered at the keyboard to perform displays and optionally select with the mouse or a touchpad items displayed on the screen. Another embodiment is a touch screen for selecting directly on the screen the elements touched by the finger or an object and optionally with the possibility of displaying a virtual keyboard.

The different modules of the platform 100 are shown separately in FIG. 1, but the invention may provide various types of arrangement, for example a single module that combines all the functions described here. Similarly, these means may be divided into several electronic boards or gathered on a single electronic board. In addition, when an action is taken to a device or module, it is actually performed by a microprocessor of the device or module controlled by instruction codes stored in a memory. Similarly, if an action is taken to an application, it is actually performed by a microprocessor of the device in a memory of which the instruction codes corresponding to the application are stored. When a device or module transmits or receives a message, this message is sent or received by a communication interface.

According to another aspect, as shown in FIG. 2, the invention relates to a method for managing a mass gathering on a geographical location, said method being implemented by a system including an analytical platform and, on the geographical location, a plurality of image acquisition devices and network sensors, said platform including a data acquisition module and a data processing module, and said method being characterized in that it includes the following steps:

- Acquiring 400, via the acquisition data module 130, participant distribution data generated from data from the plurality of image acquisition devices and participant distribution data generated from data from the plurality of network sensors;
- Calculating 500, via the data processing module, at least one corrected distribution data item of the participants in said gathering, from the acquired distribution data and based on a supervised or unsupervised learning model.

The method according to the invention may include a preliminary step 200 of building a correction model able to calculate a corrected distribution data item of the people present at the gathering. Such a step 200 is illustrated in FIG. 3.

Particularly, building the correction model may comprise a step 211 of loading distribution data generated from data from the plurality of image acquisition devices 10, as well as a step 212 of loading distribution data generated from data from the plurality of network sensors 20.

In addition, building the correction model, especially if it is based on supervised learning, may comprise a step 213 of loading actual data of counts or tags for the previously loaded data.

Building the correction model then includes a step 223 of creating the model and then a step 230 of storing this model.

One embodiment of the method according to the invention is shown in FIG. 4.

The method is then initiated by the acquisitions 410 and 420 of distribution data generated from data from the plurality of image acquisition devices 10 and the plurality of network sensors 20, respectively.

These data are then loaded into a memory 510 and 520 by the data processing module 140 which also loads 530 the correction model in a memory so as to be able to implement a calculation step 520 for generating corrected distribution data which can be then be stored 530.

As already mentioned, these corrected distribution data may be used by the processing module 140 to interpret the corrected distribution data to calculate and provide high added-value information for the administrators of the mass event. Thus, the method according to the invention may include a step 600 of analyzing the corrected distribution data item of the people present at said gathering.

FIG. 5 shows a particular embodiment of such an analysis step which starts with a step 605 of loading corrected distribution data and then a step 610 of loading predetermined critical distribution thresholds. These critical distribution thresholds can be predetermined and entered into the analytical platform by an administrator via a human-machine interface. The critical distribution thresholds may also be calculated via a learning model. The critical distribution thresholds may be different depending on the areas considered. For example, if the critical distribution thresholds are expressed in density (participant/m$^2$), then one area may have a critical distribution threshold of 3.5 people/m$^2$ while another site will have a critical distribution threshold of 2.3 people/m$^2$.

In a step 615, it is determined whether one or more thresholds have been exceeded by the corrected distribution data being analyzed. If this is the case (OK), the method initiates a step 650 of generating an alert and possibly sending instructions to electronic devices 50 connected to the analytical platform 100, for example access control devices 30 or personal bracelets 40. These alerts or actions can then be stored 670.

If no predetermined critical distribution threshold is exceeded (NOK), then the method may include a step 620 of generating predicted distribution data, as a function of time, of participants in said gathering. This step may be performed using a participant distribution prediction model. For example, from the actual corrected distribution data, the analytical platform is configured to calculate predicted distribution data for the next hours and store those 621. In a step 625, it is determined whether the predicted distribution data may exceed one or more thresholds. If this is the case (OK), the method initiates the alert 650, instruction 660 and storing 670 steps.

If no critical trend is identified in step 625 (NOK), then the method may include a step 630 of calculating a distribution pattern of the participants in said gathering and a step 631 of storing that pattern. This step may be based on critical distribution patterns, generated by the learning module. These critical distribution patterns, preferably relating to different areas, correspond for example to combinations of distribution data and while none of them exceeds critical distribution thresholds, the combination of these values suggest to a higher risk of a crowd movement. For example, a flow of people from area A to area B, combined with a flow of people from area C to area B and with a volume already present in area B may correspond to a high risk of a crowd movement. Thus, even if no critical distribution threshold is exceeded, some combinations of distribution data values between different areas may be associated with future risks.

In a step 635, it is determined whether the distribution pattern corresponds to a critical pattern. If there is no match (NOK), then the generated pattern is stored 670. If there is a match (OK), the method can initiate a step of extracting a portion of images from the image acquisition devices 10 and transmit it to a supervision module 170. This may be necessary to validate or not the risk or the occurrence of a crowd movement or any other incident. If in a step 645, the platform receives a risk validation instruction, then the method initiates the alert 650, instruction 660, and storing 670 steps. Otherwise, the generated data, including the generated pattern, are stored.

As shown in FIG. 2, the method according to the invention may also comprise a step 700 of generating a file including, preferably, the data generated by the analysis module.

As previously mentioned, the learning module 110 may also be used to generate or modify one or more critical distribution thresholds. In addition, as shown in FIG. 1 and illustrated in FIG. 6, the method according to the invention may include a step 800 of building and updating a risk prediction model.

Step 810 corresponds to loading corrected and stored distribution data which have been preferably logged by the storage module 150 and step 820 corresponds to loading stored alert data, whether they are alerts generated by the system or external alerts.

The method may also include a step 830 corresponding to loading third-party data such as, for example, hotel occupation data, number of visas issued, data relating to the access to means of transport (airports, central bus station . . . ). Step 840 corresponds to an advantageous step of splitting data by periods. Indeed, depending on the time of year, the behaviors of the people at the mass gathering may be different.

Step 850 corresponds to loading the data of the previous prediction model if the step corresponds to an update of the model.

During a step 860, the learning module will implement a supervised or unsupervised learning to build a prediction model especially capable of determining critical distribution thresholds 861, predicted distribution data as a function of time 862 and/or critical distribution patterns 863. Step 870 corresponds to storing the new model.

Thus, the system and the method according to the invention allow to provide a corrected distribution data item that is way more accurate than the distribution data that can be estimated by the methods of the prior art. Furthermore, on the basis of this corrected distribution data item, the system or the method according to the invention can carry out actions with a high added value for mass gathering organizers such as, for example: generating an alert in the event of a risk of a crowd movement or if thresholds are exceeded, identifying an area with a high risk probability in response receiving an individual alert, for example via GSM or a bracelet, providing optimal routes for evacuating people or for delivering care (in case of an individual alert for example via GSM or a bracelet), quantifying needs for maintenance and work time or planning visits depending on the crowd as quantified.

In addition, in the context of this invention, it is possible to provide a better quantification of the crowd that can then be displayed via graphical representations showing the density of people such as graphical representations of the "heat map" (Anglo-Saxon terminology) type.

The invention claimed is:

1. A system for managing a mass gathering on a geographical location, said system including an analytical platform associated with a plurality of image acquisition devices and network sensors distributed over the geographical location, the analytical platform including:
    a data acquisition module, adapted to acquire first participant distribution data generated from data from the plurality of image acquisition devices and to acquire second participant distribution data generated from data from the plurality of network sensors;
    a data processing module adapted, from the acquired first and second distribution data, to calculate based on a supervised or unsupervised learning correction model, a corrected distribution data item of participants in said gathering; and
    at least one access control device configured to control access between different areas of the geographical location.

2. The system according to claim 1, wherein the network sensors are able to connect to electronic devices via at least one communication protocol selected from: Wi-Fi, Bluetooth and GSM.

3. The system according to claim 1, wherein the correction model is selected from the following models: FP-Growth, Apriori, hierarchical clustering, k-means clustering, neural network classification, decision trees and logistic regression.

4. The system according to claim 1, further including a pre-processing module configured to generate, from raw data from the plurality of network sensors, raw participant distribution data.

5. The system according to claim 1, wherein the analytical platform includes a data storage module adapted to store the acquired first and second distribution data and the corrected distribution data.

6. The system according to claim 1, wherein the analytical platform further includes a learning module adapted to implement a supervised or unsupervised learning model so as to:
    improve the correction model used for calculating the corrected distribution data,
    improve one or more pre-processing models used for generating raw distribution data from raw data from said image acquisition devices or said network sensors, and
    analyze the corrected distribution data.

7. The system according to claim 6, wherein the learning module is configured to analyze the corrected distribution data so as to generate predictive data selected from:
    critical distribution thresholds beyond which actions may be initiated so as to reduce a risk of a crowd movement,
    predicted distribution data, as a function of time, of participants in said gathering, and
    critical distribution patterns in the presence of which actions may be taken to reduce a risk of a crowd movement.

8. The system according to claim 7, wherein said critical distribution thresholds are by area.

9. The system according to claim 7, wherein said critical distribution patterns are between different areas.

10. The system according to claim 1, wherein the analytical platform includes an analysis module adapted to compare the corrected distribution data on said geographical location to predetermined critical distribution thresholds and to generate an alert based on the comparison result.

11. The system according to claim 10, said analysis module adapted to compare the corrected distribution data to said predetermined critical distribution thresholds in real time.

12. The system according to claim 1, wherein the data processing module is able to generate further distribution data selected from:
    a total amount of participants on the geographical location or on part of the geographical location,
    a density of participants on the geographical location or on part of the geographical location, and
    a number of people entering and leaving the geographical location or part of the geographical location.

13. A method for managing a mass gathering on a geographical location, said method being implemented by a system including an analytical platform and, on the geographical location, a plurality of image acquisition devices and network sensors, said platform including a data acquisition module and a data processing module, said method including the following steps:
    acquiring, via the acquisition data module, first participant distribution data generated from data from the plurality of image acquisition devices and second participant distribution data generated from data from the plurality of network sensors;

calculating, via the data processing module, at least one corrected distribution data item of participants in said gathering, from the acquired first and second distribution data and based on a supervised or unsupervised learning model; and controlling access between different areas of the geographical location.

\* \* \* \* \*